United States Patent [19]

Yasunaga et al.

[11] Patent Number: 4,885,189
[45] Date of Patent: Dec. 5, 1989

[54] METHOD OF PRODUCING MAGNETIC RECORDING MEDIA

[75] Inventors: Tadashi Yasunaga; Ryuji Shirahata, both of Kanagawa, Japan

[73] Assignee: Fuji Photo Film Co., Ltd., Kanagawa, Japan

[21] Appl. No.: 110,820

[22] Filed: Oct. 21, 1987

[30] Foreign Application Priority Data

Oct. 21, 1986 [JP] Japan ................................. 61-249874
Oct. 24, 1986 [JP] Japan ................................. 61-252848

[51] Int. Cl.⁴ ............................................. B05D 5/12
[52] U.S. Cl. ..................................... 427/129; 427/130; 427/131; 427/132; 427/172; 427/177; 427/296; 427/327
[58] Field of Search .............. 427/132, 128, 131, 130, 427/177, 377, 378, 350, 129, 296, 322; 428/694, 900

Primary Examiner—Bernard Pianalto
Attorney, Agent, or Firm—Sughrue, Mion, Zinn, Macpeak & Seas

[57] ABSTRACT

A method for producing a magnetic recording medium, comprising the steps of: (1) preparing a takeup evaporated article under a takeup tension of $13.5 \times 10^{-8}$ b/t Kg-weight or more when a magnetic metal/alloy thin film is provided on a flexible substrate that is b mm wide and t m thick by takeup evaporation; (2) rewinding said evaporated article under a takup tension of $13.5 \times 10^{-8}$ b/t Kg-weight or less; and (3) preserving said rewound article in an oxidation accelerating atmosphere. A method for producing a magnetic recording medium comprising the steps of: (1) preparing a takeup evaporated article by providing a magnetic metal/alloy thin film on a flexible substrate by takeup evaporation and (2) preserving said takeup evaporated article under the condition that an air stream containing an oxidizing gas is generated in winding gaps of said evaporated article.

12 Claims, 2 Drawing Sheets

METHOD OF PRODUCING MAGNETIC RECORDING MEDIA

FIELD OF THE INVENTION

The present invention relates to a method of producing a magnetic recording medium, and more particularly, relates to a method of producing a metal thin film type magnetic recording medium excellent in weather resistance and in preservation stability.

BACKGROUND OF THE INVENTION

Heretofore, so-called "coating type" magnetic recording media which are formed by applying powders of magnetic material dissolved in organic binders onto non-magnetic substrates and drying the same, have been generally used as recording media. However, the recent requirements of high-density magnetic recording have directed attention to so-called "metal thin film type" magnetic recording media having a large quantity of saturation magnetic flux. Research and development of magnetic media, such as an evaporated tape prepared by using an oblique evaporating method with Co, Fe, Ni and the like as a material and a perpendicular magnetic tape, disc and the like prepared by using a sputtering or evaporating method with a Co-Cr alloy, has been in progress.

Generally, the "metal thin film type" magnetic recording media have relatively large latent faculties in both electromagnetic transducing characteristics and recording density, compared to the latent faculties of the conventional "coating type" magnetic recording media. However, low weather resistance is a fatal weak point of the "metal thin film type" magnetic recording media.

As an example, when the media are left under an atmosphere of high temperature and humidity, oxidation of the metal film proceeds to cause a problem in that the gross amount of magnetic flux is decreased by 10% or more.

As another example, repetition of a dew condensation-drying process causes a problem in that rust is produced in an amount sufficient to see it with the naked eye.

As a further example, which relates to the so-called evaporated tape formed by applying cobalt onto a polyester film by the oblique evaporating method, rust is produced even in the case where the tape is left for about a week under an atmosphere of 60° C. and 90% RH, the result being that the rust blocks the head in recording or reproducing operations in a deck. Furthermore, if a very small amount of NaCl fine crystals in the form of a sol, and about 1 ppm sulfurous acid gas or the like is present in the atmosphere, the rust increases to generate a serious barrier to use.

These phenomena of decreasing the magnetic flux and producing rust are generically called "weather resistance".

The problem of failure in weather resistance of the metal thin film type media has been generally recognized. Therefore, various techniques for improving weather resistance have been proposed. However, these techniques have the following problems: most of the techniques do not have a sufficient effect; some of the techniques sacrifice productivity for the necessity of large-scale equipment; and some of the techniques sacrifice other characteristics, such as electromagnetic transducing characteristics and the like. Hence, a more simple and more effective improvement in weather resistance has been desired.

SUMMARY OF THE INVENTION

Accordingly, an object of the present invention is to provide a method of producing a magnetic recording medium improved in weather resistance as well as in preservation stability.

This and other objects have been achieved in one embodiment of the present invention by providing a method for producing a magnetic recording medium comprising the steps of: (1) preparing a takeup evaporated article under a takeup tension of $13.5 \times 10^{-8}$ b/t Kg-weight or more when a magnetic metal/alloy thin film is provided on a flexible substrate that is b mm wide and t m thick by takeup evaporation; (2) rewinding the evaporated article under a takeup tension of $13.5 \times 10^{-8}$ b/t Kg-weight or less; and (3) preserving the rewound article in an oxidation accelerating atmosphere.

According to another embodiment of the present invention, there is provided a method for producing a magnetic recording medium comprising the steps of: (1) preparing a takeup evaporated article by providing a magnetic metal/alloy thin film on a flexible substrate by takeup evaporation; and (2) preserving the prepared takeup evaporated article under the condition that an air stream containing an oxidizing gas is generated in the winding gaps of the evaporated article.

DETAILED DESCRIPTION OF THE INVENTION

According to the present invention, examples of materials for the flexible substrate according to both embodiments include plastics, such as mainly polyethylene terephthalate, polyimide, polyamide, polyvinyl chloride, cellulose triacetate, polycarbonate, polyethylene naphthalate and the like.

Examples of materials for the magnetic metal/alloy used in both embodiments of the present invention include metals, such as Fe, Co, Ni and the like; and alloys, such as Fe-Co, Fe-Ni, Co-Ni, Fe-Co-Ni, Fe-Rh, Co-Cu, Co-Pr, Co-Sm, CO-Ti, Ni-Cu, Co-Cr, Fe-Cr, Ni-Cr and the like. Generally, partial oxidation and/or nitriding or the like of the magnetic metal/alloy prepared in the form of a thin film on the substrate gives more desirable characteristics. The preferred material is a metal of Co or an alloy containing 70% by weight or more of Co.

Figure 1:
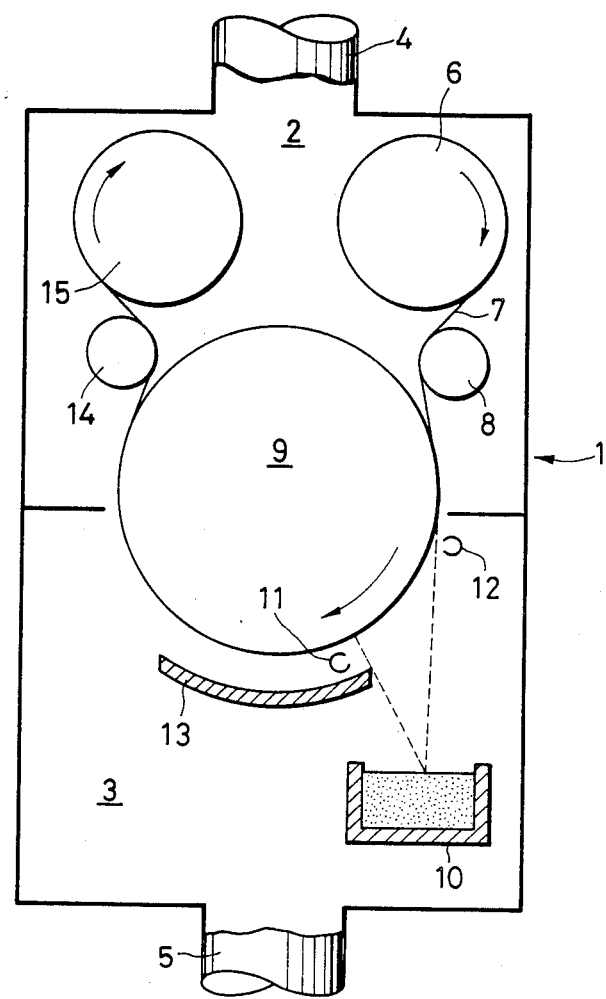
FIG. 1 shows a takeup evaporating apparatus.

In the figures like numerals refer to like elements.
Referring now to FIG. 1, there is shown an example of a takeup evaporating apparatus 1. In the case where the apparatus is used, the preparation of a takeup evaporated article is carried out in the following manner.

The evaporating apparatus 1 has two chambers which are a flexible substrate feed and takeup chamber 2 and an evaporation chamber 3 provided with air discharging pipes 4 and 5. In the evaporating apparatus 1, a flexible substrate 7 is fed from a feed roll 6, moved along a cooling drum 9 and then wound on a takeup roll 15. Numerals 8 and 14 designate rolls. In the lower chamber 3 which is an evaporation chamber, a vapor stream from a crucible 10 is accumulatedly deposited on the substrate to form a magnetic thin film. One technique shown in FIG. 1 is of forming a magnetic film by so-called oblique evaporation, in which the film forming is carried out by using a mask 13 to partly restrict the incident vapor stream. Another technique shown in FIG. 1 is the technique of using gas-intake ducts 11 and 12 (or only a gas-intake duct 11) to bring an oxidizing gas or the like into the chamber to thereby control magnetic characteristics. The apparatus shown in FIG. 1 is a half-continuous type takeup evaporating apparatus, in which an evaporated article is obtained on the takeup roll 15 corresponding to the length of the substrate at the point in time when the formation of the thin-film on the substrate fed from the feed roll 6 is finished.

In the apparatus shown in FIG. 1, the takeup or winding tension of the present invention can be established by controlling tension when the substrate is wound on the takeup roll 15. The takeup tension is preferably $13.5 \times 10^{-8}$ b/t kg-weight or more, more preferably $18 \times 10^{-8}$ b/t kg-weight or more, when the flexible substrate is b mm wide and t m thick.

The upper limit of the takeup tension is not fixed specifically, but for example in the case of about $10^{-6}$ b/t kg-weight, the plastic substrate might be undesirably deformed.

In the case of $13.5 \times 10^{-8}$ b/t kg-weight or less, on the contrary, the substrate is easily wrinkled in relation to the parallel degree of the roller, particularly when the width b of the substrate is 500 mm or more. Further, the generation of wrinkles of the substrate relate also to the tension between the cooling drum 9 and the feed roll 6. If the substrate is not sufficiently cooled, the substrate is subject to intense radiant heat so that it may suffer heat damage. These phenomena undesirably decrease the yield.

The thus prepared takeup evaporated article is picked up from the evaporating apparatus to be rewound and subjected to a preservative treatment. The article is rewound with the takeup tension of $13.5 \times 10^{-8}$ b/t kg-weight or less when the flexible substrate is b mm wide and t m thick. More preferably, the tension is $11 \times 10^{-8}$ b/t kg-weight or less. If the tension is not larger than $3 \times 10^{-8}$ b/t kg-weight, the rewound roll may undesirably get out of shape. The rewinding can be performed in an atmosphere of ordinary air.

The thus rewound takeup evaporated article is preserved for a predetermined time or more in an oxidation accelerating atmosphere. The predetermined time varies according to the film width and takeup tension, but generally it is preferably not less than 12 hours. The oxidation accelerating atmosphere herein used means an atmosphere of gas containing an oxidizing gas, such as oxygen gas, ozone gas and the like. For example, the atmosphere may be an air atmosphere or may be a pressured oxidizing gas-containing atmosphere.

Figure 2:
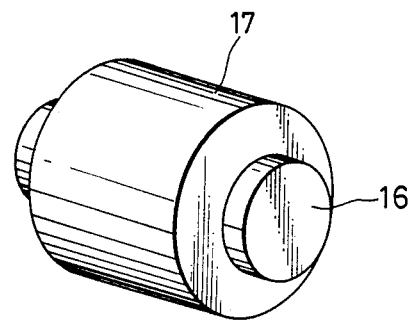
FIG. 2A shows the outside of a takeup evaporated article.
FIG. 2B shows an apparatus for generating an air stream.
Figure 2B:
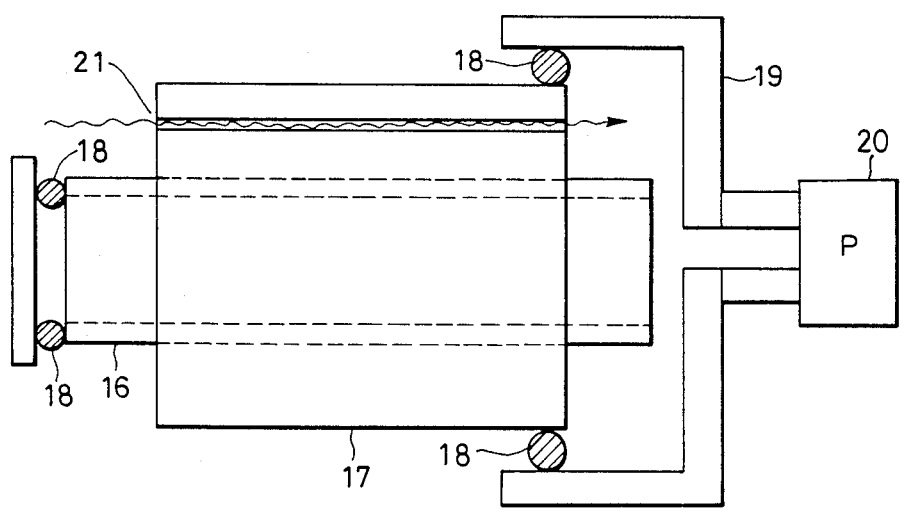

To preserve the takeup evaporated article in the oxidation accelerating atmosphere, means for generating an air stream into winding gaps of the takeup evaporated article as shown in FIGS. 2A and 2B may be employed in the present invention.

That shown in FIG. 2A is a takeup evaporated article in which typically a substrate 17 coated with a thin film is rolled around a hollow reel 16. FIG. 2B typically shows means for generating an air stream into winding gaps 21, in which the takeup evaporated article sealed by airtight seals 18 is subjected to a vacuum from a vacuum pump 20 to thereby generate an air stream. Numeral 19 designates a sealing frame provided with the vacuum pump 20. Generally, in the case where a metal thin film is applied on a plastic substrate or in the case where the substrate is very thin, the winding gaps 21 of the takeup evaorated article are so narrow that the air stream must be generated intentionally as shown in FIGS. 2A and 2B. In FIG. 2B, the atmosphere forming the air stream may be formed of air or may be formed of a gas having a higher oxygen concentration then air to heighten the effect of the present invention. Further, a more active gas, such as ozone or the like, may be used. Furthermore, $NH_3$ gas, $NO_2$ gas, $H_2S$ gas or the like may be used to control the characteristics according to the combination of the thin-film material and the gas contained in the air stream. Thus, the present invention provides a simple means for reacting the metal thin film still active just after the completion of the takeup evaporation to thereby make the thin film more stable. The time required for subjecting the article to the air stream varies according to the film width, but generally it is preferably not shorter than 12 hours.

In the case where the takeup evaporated article is preserved in the oxidation accelerating atmosphere by use of the apparatus of FIG. 2B, the aforementioned rewinding may be omitted. In this case, a sufficient effect can be attained even if the rewinding is omitted.

EXAMPLES

The effect of the present invention will now be described in detail in connection with comparative examples.

Unless otherwise specified, all percents, ratios, etc. are by weight.

COMPARATIVE EXAMPLE 1

Using the evaporating apparatus shown in FIG. 1, an evaporated magnetic thin film of $Co_{80}Ni_{20}$ (atom%) was formed on a 9 μm thick substrate of polyethylene terephthalate by an oblique evaporating method. A film of 100 mm wide and 1500 m long was used as a substrate. Under the conditions of a feed speed of 25 m per minute, an incident angle of $\theta_{min} = 25$ degrees and a film thickness of 2000 Å, evaporation was carried out in an atmosphere of an $O_2$ gas brought into the evaporation chamber from the gas intake duct 11 to produce a vacuum of $3.0 \times 10^{-4}$ Torr.

Three takeup evaporated articles were prepared under the takeup tension of 2.5 kg-weight. One of the articles (designated Sample A) was left in the air at ordinary temperature and humidity for five days as it was. Another one of articles (designated Sample B) was rewound under a takeup tension of 1.75 kg-weight and then left in the same condition for five days. The third article (designated Sample C) was rewound under a takeup tension of 1 kg-weight and then left in the same condition for five days.

Four pieces of 10 m/m × 75 m/m size were cut out of each of the thus prepared three samples, at four positions which were apart from one another at equal intervals of 500 m. (The respective pieces were designated Samples A1 to A4, B1 to B4, and C1 to C4, in which the pieces smaller in number were nearer to the center of the roll.) The thus prepared twelve samples were left in an atmosphere of 60° C. and 90% RH for a week. The rate of change—$\Delta \phi m/\phi m$ of the gross magnetic flus $\phi m(Mx/cm)$ was measured before letting the samples stand for a week and after leaving of the samples stand for a week. The results are shown in Table 1 (in which the numerical values are expressed by %).

TABLE 1

| A1 | | A2 | | A3 | | A4 | |
|----|----|----|----|----|----|----|----|
|    | 15 |    | 14 |    | 15 |    | 9 |
| B1 |    | B2 |    | B3 |    | B4 |    |
|    | 15 |    | 13 |    | 10 |    | 8 |
| C1 |    | C2 |    | C3 |    | C4 |    |
|    | 6  |    | 6  |    | 7  |    | 6 |

As the rate of change—$\Delta \phi m/\phi/m$ decreases, the sample is more improved in weather resistance. Sample B is slightly improved compared to Sample A. However Sample C has similarly smaller values for the whole length of the roll. Consequently, Sample C is remarkably improved in weather resistance.

COMPARATIVE EXAMPLE 2

Using the evaporating apparatus shown in FIG. 1, an evaporated magnetic thin film of $Co_{80}Ni_{20}$ (atom%) was formed on a 9.5 μm thick substrate of polyethylene terephthalate by an oblique evaporating method. A film of 300 mm wide and 5000 m long was used as the substrate. Under the conditions of a feed speed of 60 m per minute, an incident angle of $\theta_{min}=35$ degrees, and a film thickness of 2000 Å, evaporation was carried out in an atmosphere of $O_2$ gas brought into the evaporation chamber 3 from the gas intake ducts 11 and 12 to produce a vacuum of $3.0\times 10^{-4}$ Torr. Two takeup evaporated articles were prepared under the same conditions. One of the articles (designated Sample D) was left in the air at ordinary temperature and humidity for a week as it was. The other article (designated Sample E) was placed in the apparatus shown in FIG. 2B and continuously subjected to a vacuum from the rotary pump 20 for a week so that an air stream flowed through the winding gaps.

Six pieces of 10 m/m×75 m/m size were cut out of each of the thus prepared two samples, at six positions which were apart from one another at equal intervals of 1000 m. (The respective pieces were designated Samples D1 to D6 and E1 to E6, in which the pieces smaller in number originated at a place nearer to the center end of the roll.) The twelve samples were left in an atmosphere of 60° C. and 90% RH for a week. The rate of change—$\Delta \phi m/\phi m$ of the gross magnetic flux $\phi m$(Mx/cm) was measured before and after leaving the samples stand. The results are shown in Table 2 (in which the numerical values are expressed by %).

TABLE 2

| D1 | | D2 | | D3 | | D4 | | D5 | | D6 | |
|----|----|----|----|----|----|----|----|----|----|----|----|
|    | 12 |    | 10 |    | 11 |    | 10 |    | 10 |    | 5 |
| E1 |    | E2 |    | E3 |    | E4 |    | E5 |    | E6 |    |
|    | 5  |    | 4  |    | 4  |    | 4  |    | 5  |    | 4 |

A sample is more improved in weather resistance as the rate of change—$\Delta \phi m/\phi m$ is smaller. Sample E has similarly small values for all of Samples E1 to E6, whereas Sample D has no small values except for the outermost Sample D6. It is apparent that the inner end of the roll in Sample D is inferior in weather resistance.

As described above, metal thin film type magnetic recording media excellent in weather resistance and preservative stability can be manufactured simply and uniformly by the method according to the present invention.

While the invention has been described in detail and with reference to specific embodiments thereof, it will be apparent to one skilled in the art that various changes and modifications can be made therein without departing from the spirit and scope thereof.

What is claimed is:

1. A method for producing a magnetic recording medium, comprising the steps of: (1) preparing, by takeup evaporation, a takeup evaporated article comprising a flexible substrate coated with a magnetic metal/alloy thin film rolled around a first reel, under a takeup tension of $13.5\times 10^{-8}$ b/t Kg-weight or more when said magnetic metal/alloy thin film is provided on said flexible substrate, wherein b is the width (in mm) of said flexible substrate and t is the thickness (in m) of said flexible substrate; (2) rewinding said coated flexible substrate on a second reel under a takeup tension of $13.5\times 10^{-8}$ b/t Kg-weight or less; and (3) preserving said rewound coated flexible substrate in an oxidation accelerating atmosphere.

2. A method for producing a magnetic recording medium comprises the steps of: (1) preparing a takeup evaporated article comprising a flexible substrate coated with a magnetic metal/alloy thin film rolled around a reel, by providing said magnetic metal/alloy thin film on said flexible substrate by takeup evaporation; and (2) preserving said takeup evaporated article under the condition that an air stream containing an oxidizing gas is incorporated into winding gaps of said takeup evaporated article.

3. The method of claim 1, wherein said step (1) for preparing the takeup evaporated article comprises:
   feeding the substrate from a feed roller;
   moving the substrate along a cooling drum while a vapor stream of the magnetic metal/alloy is deposited on the substrate, to thereby form a magnetic film on the substrate; and
   winding the substrate with the film formed thereon on a takeup roll under a takeup tension of $13.5\times 10^{-8}$ b/t Kg-weight or more, wherein b is the width (in mm) of the flexible substrate and t is the thickness (in m) of the flexible substrate.

4. The method of claim 3, wherein said takeup tension is $18\times 10^{-8}$ b/t Kg-weight or more.

5. The method of claim 3, wherein said rewound coated flexible substrate is preserved in an oxidation accelerating atmosphere for 12 hours or more.

6. The method of claim 3, wherein the oxidation accelerating atmosphere is atmospheric air.

7. The method of claim 3, wherein said step (3) for preserving said rewound flexible substrate comprises a step for preserving said rewound coated flexible substrate under the condition that an air stream containing an oxidizing gas is generated in winding gaps of said rewound coated substrate.

8. The method of claim 3, wherein said step (1) for preparing the takeup evaporated article is performed in a vacuum.

9. The method of claim 2, wherein said step (1) for preparing the takeup evaporated article comprises:
   feeding the substrate from a feed roller;
   moving the substrate along a cooling drum while a vapor stream of the magnetic metal/alloy is deposited on the substrate, to thereby form a magnetic film on the substrate; and
   winding the substrate with the film formed thereon on a takeup roll under a takeup tension of $13.5\times 10^{-8}$ b/t Kg-weight or more, wherein b is the width (in mm) of the flexible substrate and t is the thickness (in m) of the flexible substrate.

10. The method of claim 9, wherein said takeup tension is $18 \times 10^{-8}$ b/t Kg-weight or more.

11. The method of claim 9, wherein said takeup evaporated article is preserved under the condition that an air stream containing an oxidizing gas is incorporated into winding gaps of said takeup evaporated article for 12 hours or more.

12. The method of claim 9, wherein said step (1) for preparing the takeup evaporated article is performed in a vacuum.

* * * * *